Aug. 22, 1967    M. STEINBERG    3,337,258
FLOOR MATS FOR VEHICLES
Filed March 10, 1965    3 Sheets-Sheet 1
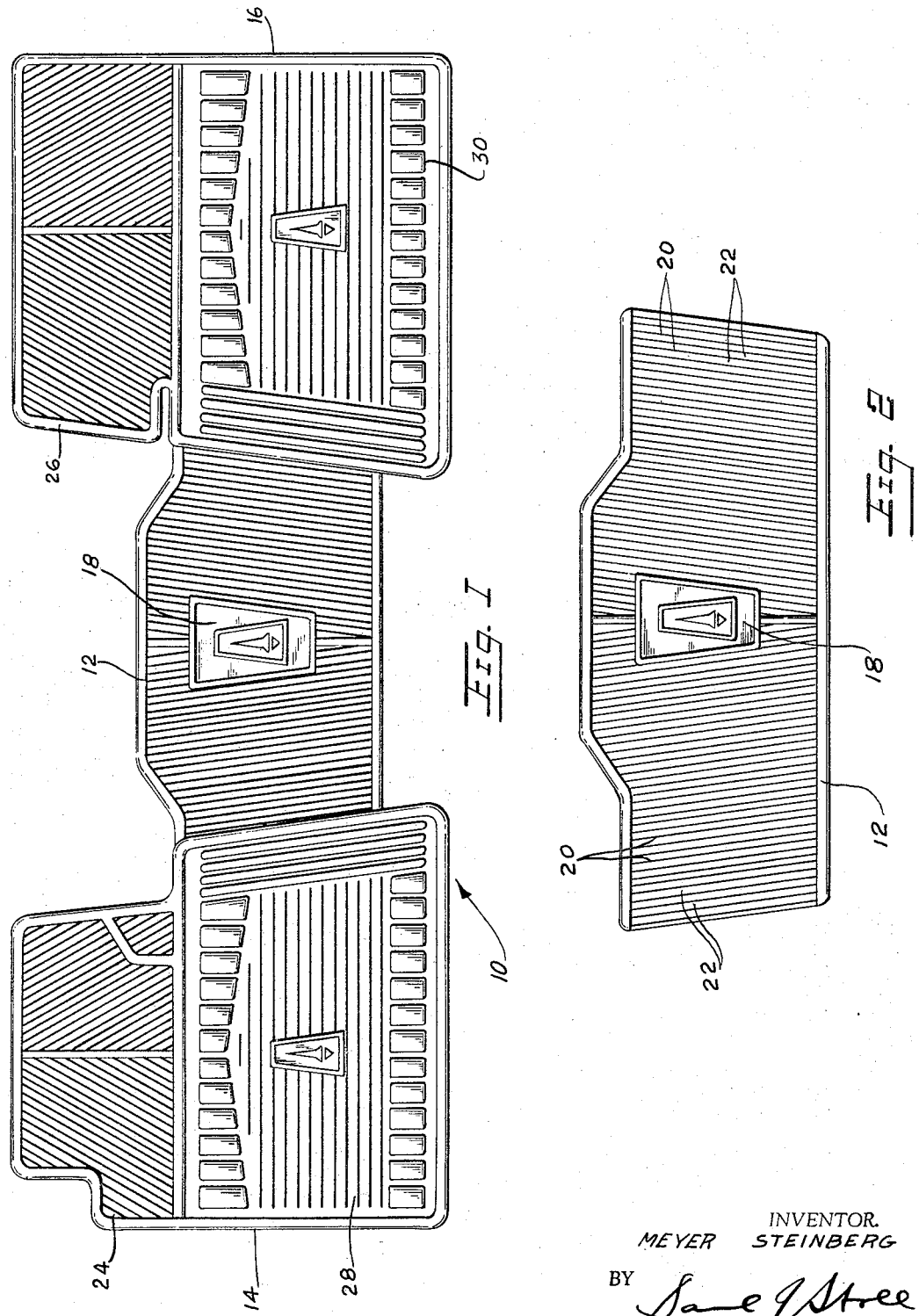
INVENTOR.
MEYER STEINBERG
BY
ATTORNEY Aug. 22, 1967     M. STEINBERG     3,337,258
FLOOR MATS FOR VEHICLES
Filed March 10, 1965     3 Sheets-Sheet 2
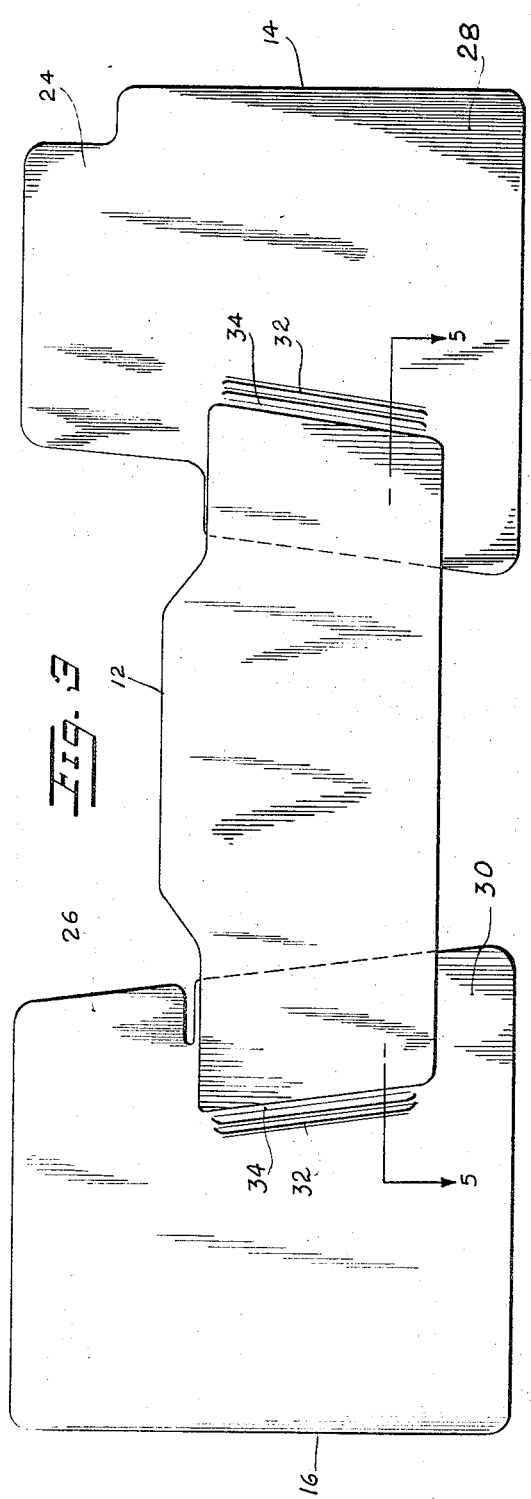
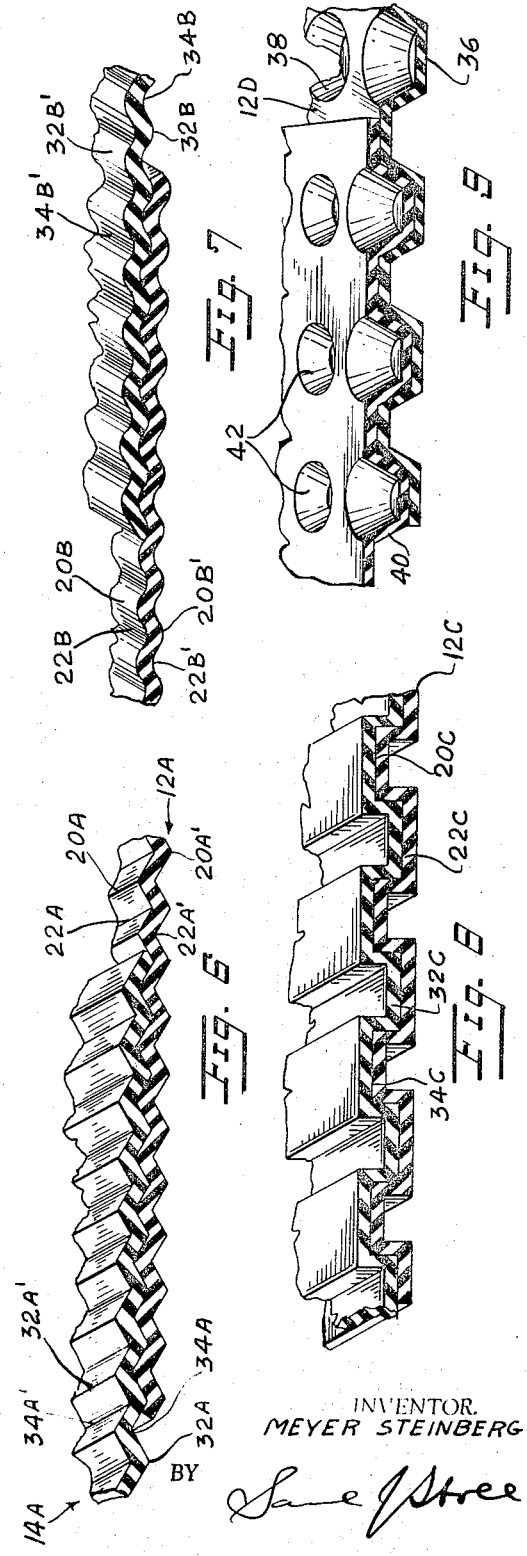
INVENTOR.
MEYER STEINBERG
BY
ATTORNEY Aug. 22, 1967    M. STEINBERG    3,337,258
FLOOR MATS FOR VEHICLES
Filed March 10, 1965    3 Sheets-Sheet 3
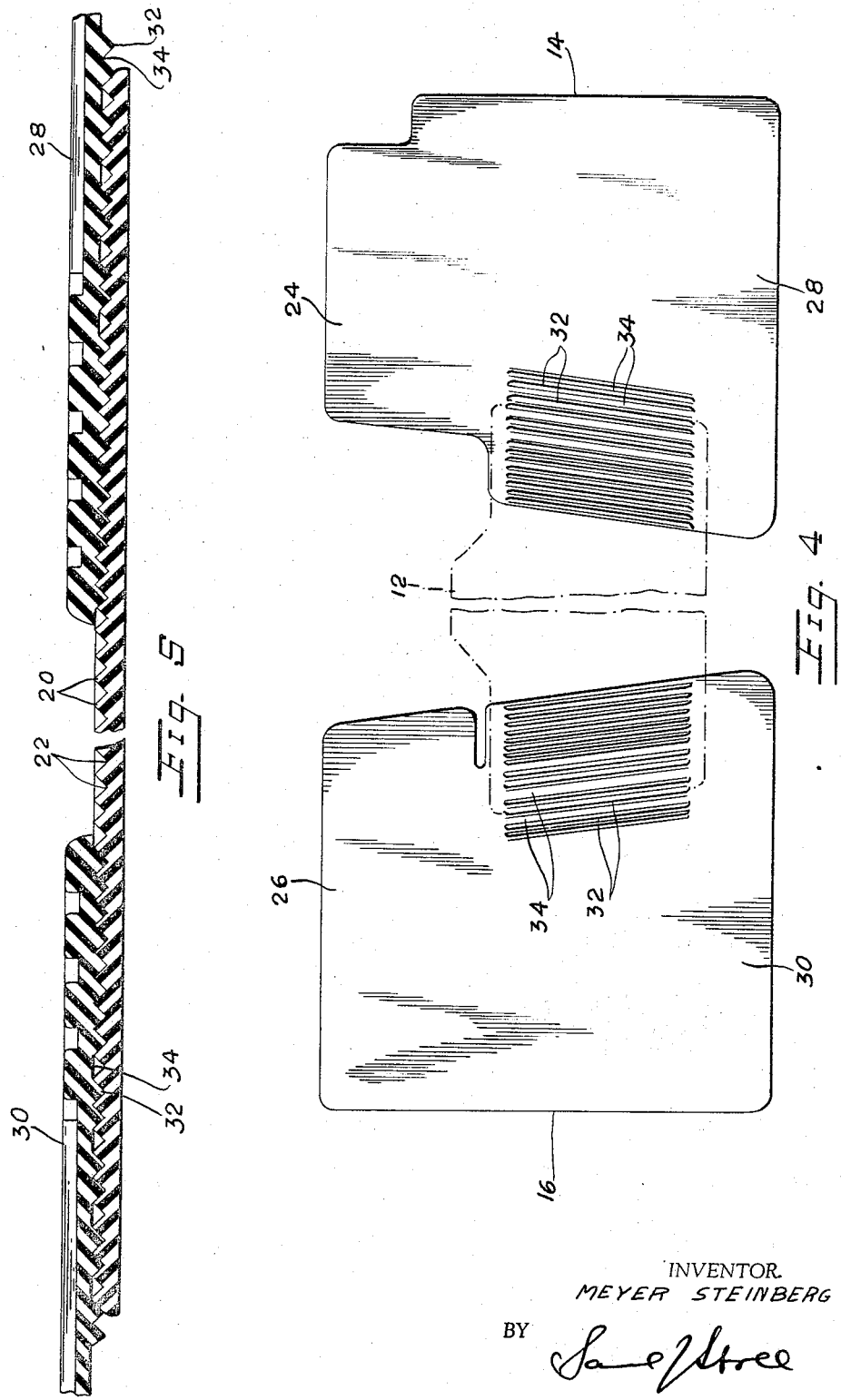
INVENTOR.
MEYER STEINBERG
BY
ATTORNEY United States Patent Office 3,337,258
Patented Aug. 22, 1967

3,337,258
FLOOR MATS FOR VEHICLES
Meyer Steinberg, Woodmere, N.Y., assignor to Ideal Rubber Products Co., Inc., Brooklyn, N.Y.
Filed Mar. 10, 1965, Ser. No. 438,622
6 Claims. (Cl. 296—1)

The present invention relates to floor mats for use in vehicles and more particularly to floor mats for use in automobiles.

Present day floor mats which are made for use in automobiles and other vehicles, are manufactured in various lengths which correspond to the various widths of the automobiles in which they are to be employed. However, the width of the automobile alone is not the only factor in determining the length of the floor mat; provision must also be made for the vertical rise on the floor of said automobile created by the hump formed thereon to provide space for the transmission and crankshaft of said automobile. It is therefore readily apparent that the manufacturer of floor mats for use in automobiles and other vehicles must manufacture a great number of various sized floor mats in order to provide for all makes of vehicles as well as the various models thereof. Furthermore, the number of floor mats required increases each year in dependence upon the number of new vehicles and models thereof which are manufactured.

It is therefore the primary object of the present invention to provide a floor mat assembly which can be utilized with all makes and models of automobiles and other vehicles.

It is yet another object of the present invention to provide a floor mat assembly which is easily installed upon the floor of an automobile.

It is yet another object of the present invention to provide a floor mat assembly which is highly decorative as well as utilitarian.

It is a further object of the present invention to provide a floor mat assembly for use in automobiles and the like composed of three individual sections.

It is yet a further object of the present invention to provide a floor mat assembly which can be utilized for automobiles either having or not having humps on the floor thereof, and either on the front floor portions or the rear floor portions thereof.

It is still another object of the present invention to provide a floor mat assembly which can be manufactured simply and rather inexpensively.

These and other objects of the present invention will become more apparent when viewed in conjunction with the accompanying drawings wherein:

FIGURE 1 is a top view of the preferred embodiment of the floor mat assembly of the present invention.

FIGURE 2 is a top view of the center section of the floor mat assembly depicted in FIGURE 1.

FIGURE 3 is a bottom view of the floor mat assembly depicted in FIGURE 1.

FIGURE 4 is a bottom view of the side sections of the floor mat assembly depicted in FIGURE 1.

FIGURE 5 is a sectional view taken on the line 5—5 of FIGURE 3.

FIGURE 6 is a partial sectional view in perspective of a second embodiment of the present invention taken through the center section and one of the side sections thereof.

FIGURE 7 is a partial sectional view in perspective of a third embodiment of the present invention taken through the center section and one of the side sections thereof.

FIGURE 8 is a partial sectional view in perspective of a fourth embodiment of the present invention taken through the center section and one of the side sections thereof.

FIGURE 9 is a partial sectional view in perspective of a fifth embodiment of the present invention taken through the center section and one of the side sections thereof.

Referring now to the drawings, there is shown a floor mat assembly 10 constructed in accordance with the preferred embodiment of the present invention. The floor mat assembly comprises a center section 12, a left side section or wing 14 and a right side section or wing 16. The floor mat assembly, and more particularly the sections 12, 14 and 16 thereof, have a sheet-like configuration and are preferably made of rubber, but may be made of any other suitable material; and are primarily intended for use upon the front floor portion of an automobile or the like, but may also be effectively utilized upon the rear floor portion thereof.

The center section 12 includes a design portion 18, centrally located thereon and a plurality of substantially lateral ridges 20 formed on the top surface thereof and extending longitudinally thereon in parallel equidistantly spaced relationship with respect to one another, whereby the ridges 20 form grooves or slots 22 therebetween.

The left side and right side sections 14 and 16, respectively, are composed of upper members 24 and 26 and lower members 28 and 30, respectively; the upper members being adapted to be placed upon the inclined portion of the floor of said automobile and the bottom members being adapted to be placed upon the flat or horizontal portion of said automobile floor.

The lower members 28 and 30 have a plurality of substantially longitudinal ridges 32 formed on the rear surface thereof; said ridges extending along a portion of the inner side edges of said lower members in spaced parallel relationship with respect to one another, whereby the ridges 32 form grooves or slots 34 therebetween. It should be noted that although the ridges 32 are not all equidistant from one another in the present embodiment, the same is within the contemplation of the present invention.

When the floor mat assembly 10 is desired to be installed in the front portion of an automobile or similar vehicle, the center section 12 is placed upon the floor of said automobile over the hump thereon; said design portion 18 being used to center said section 12 upon said floor. The side sections 14 and 16 are then selectively placed upon the left and right side portions of said floor with the bottom inner edge portions of said sections being placed upon the edge portions of said center section, and the slots 34 on the bottom surface of the sections 14 and 16 engage the ridges 20 on the top surface of the center section 12, while the slots 22 on the top surface thereof engage the ridges 32 on the bottom surface of the side sections 14 and 16, thereby positionally securing said side sections with respect to said center section and with respect to the floor of said automobile. The portions of the surfaces of center section 12 and side sections 14 and 16 which meet to engage each other are hereinafter sometimes referred to as mating surfaces.

It will be readily apparent that since the side sections 14 and 16 are detachably securable to the center section 12, whereby the effective length of the floor mat assembly can be varied, the floor mat assembly can be installed upon the floor of any make or model of automobile or the like and the length thereof adjusted, so as to conform to the width of said automobile.

A second embodiment of the present invention is depicted in FIGURE 6, wherein similar parts are denoted by similar reference numerals.

In this embodiment both the center section and the side sections have top and bottom corrugated surface portions, having a saw-tooth configuration, thus forming ridges 20A and slots 22A on the top surface of said center section 12A, and ridges 20A' and 22A' on the bottom surface thereof, while the left side section 14A has ridges 32A and slots 34A formed on the bottom surface thereof and ridges 32A' and slots 34A' formed on the top surface thereof. This then permits the side sections to be placed upon the center section to positionally secure the same with respect thereto, or the side sections may be placed upon the floor of the automobile first and then the center section may be placed upon said side sections, thereby positionally securing said center section with respect to said side sections.

A third embodiment of the present invention is depicted in FIGURE 7, wherein similar parts are denoted by similar reference numerals.

This embodiment is similar to that depicted in FIGURE 6, except that the corrugations on said surfaces are wavy, thereby forming arcuate ridges 20B, 20B', 32B, 32B', and arcuate slots 22B, 22B', 34B, 34B'. In this embodiment the center section may also be positioned beneath or above the side sections.

A fourth embodiment of the present invention is depicted in FIGURE 8, wherein similar parts are denoted by similar reference numerals.

In this embodiment the center section 12C has a rectangular corrugation, thereby forming rectangular shaped ridges 20C and rectangular slots 22C on the top surface thereof and the side sections also have rectangular corrugations, forming rectangular ridges 32C and rectangular slots 34C on the bottom surface thereof. The side sections are adapted to be placed upon the center section, whereupon, the slots 34C engage the ridges 20C and the slots 22C engage the ridges 32C, thereby positionally securing said ridge sections with respect to said center section.

A fifth embodiment of the present invention is depicted in FIGURE 9, wherein similar parts are denoted by similar reference numerals.

In this embodiment the center section 12D includes a portion having a plurality of integrally formed hollow frustum shaped cups 36 which project downwardly from the bottom surface thereof and define a plurality of frustum shaped openings or recesses 38 therein; said cups, and thereby said recesses, preferably being formed in equidistant spaced relationship with respect to one another. Similarly, the side sections include portions thereof having a plurality of integrally formed hollow frustum shaped cups 40 which project downwardly from the bottom surfaces thereof and define a plurality of frustum shaped openings or recesses 42 therein; the cups 40 and thus the openings 42 being equidistantly spaced with respect to one another in a manner similar to those of the cups 36 and openings 38 in said center section. Thus, when the side sections are placed upon the center section, the cups 40 are seated or placed in nested relationship within the recesses 38, thereby positionally securing said side sections with respect to said center section. Alternatively, the center sections may be positionally secured with respect to said side sections by placing said center section upon said side sections and seating the cups 36 in the recesses 42.

It should be noted that the center section 12D may also be formed having cylindrical openings and the side sections may be formed having cylindrical cups projecting downwardly from the bottom surfaces thereof, whereupon the side sections may be positionally secured with respect to said center section, as described hereinabove.

It is thus seen that I have provided a floor mat assembly whose length can be selectively varied, whereby a single floor mat assembly can be utilized for all the various makes and models of automobiles and similar type vehicles, thus obviating the need of a manufacturer to make, and a distributor or seller to store, a great number of floor mats of varying size.

While I have shown and described the preferred embodiments of my invention, there are many modifications which may be made therein by persons skilled in the art without departing from the spirit and scope of the invention as defined by the appended claims.

What is claimed is:

1. A floor mat assembly for use in automobiles and the like, said floor mat assembly comprising a center section and two side sections, said center and side sections including means integrally fomred therewith adapted to selectively and detachably secure said side sections and said center section, whereby the length of said floor mat assembly may be selectively varied so as to conform to the width of the floor of said automobile, and wherein said means which are adapted to selectively and detachably secure said side sections and said center sections comprise a plurality of spaced ridges defining grooves therebetween formed on at least a portion of the mating surface of the center section and a plurality of spaced ridges defining grooves therebetween formed on at least a portion of the mating surfaces of each of the side sections, whereby said side sections may be positionally secured to said center section by being placed with the grooves on the mating surface of said center section engaging the ridges on the mating surfaces of said side sections and the grooves on the mating surfaces of said sections engaging the ridges on the mating surface of said center section.

2. A floor mat assembly in accordance with claim 1, wherein said grooves and ridges on said center and side sections are defined by corrugations thereon, said respective grooves and ridges being in equidistantly spaced parallel relationship with respect to one another.

3. A floor mat assembly in accordance with claim 2, wherein said corrugations have a saw-tooth configuration.

4. A floor mat assembly in accordance with claim 2, wherein said corrugations have a wavy configuration.

5. A floor mat assembly in accordance with claim 2, wherein said corrugations have a rectangular configuration.

6. A floor mat assembly for use in automobiles and the like, said floor mat assembly comprising a center section and two side sections, said center and side sections including means integrally formed therewith adapted to selectively and detachably secure said side sections and said center section, whereby the length of said floor mat assembly may be selectively varied so as to conform to the width of the floor of said automobile, wherein said means which are adapted to selectively and detachably secure said side sections to said center section comprises a plurality of spaced vertical recesses formed in at least a portion of the mating surface of the center section and a plurality of spaced vertical projections extending from at least a portion of the mating surfaces of said side sections, whereby said side sections may be positionally secured to said center section by being placed with the recesses on the mating surface of said center section engaging the projections on the mating surfaces of said side sections in nesting relationship and wherein said recesses and said projections are of frusto-conical configuration.

References Cited

UNITED STATES PATENTS

| 2,499,898 | 3/1950 | Anderson | 24—208.3 |
| 3,094,350 | 6/1963 | Cusick | 296—1 |
| 3,176,364 | 4/1965 | Dritz | 24—201.3 |

FOREIGN PATENTS

| 1,176,188 | 11/1958 | France. |

BENJAMIN HERSH, *Primary Examiner.*

P. GOODMAN, *Assistant Examiner.*